(12) United States Patent
Hart et al.

(10) Patent No.: US 9,385,955 B2
(45) Date of Patent: Jul. 5, 2016

(54) CHANNEL BONDING FOR MULTIPLE COMMUNICATION SYSTEMS

(71) Applicant: Rogers Communications Inc., Toronto (CA)

(72) Inventors: George Maynard Hart, Campbellville (CA); Victor Kuarsingh, Mississauga (CA)

(73) Assignee: Rogers Communications Inc., Toronto (CA)

( * ) Notice: Subject to any disclaimer, the term of this patent is extended or adjusted under 35 U.S.C. 154(b) by 484 days.

(21) Appl. No.: 13/778,590

(22) Filed: Feb. 27, 2013

(65) Prior Publication Data

US 2014/0241166 A1 Aug. 28, 2014

(51) Int. Cl.
*H04L 12/801* (2013.01)
*H04L 12/28* (2006.01)
*H04L 12/26* (2006.01)

(52) U.S. Cl.
CPC ............ *H04L 47/12* (2013.01); *H04L 12/2861* (2013.01); *H04L 12/2863* (2013.01); *H04L 12/2867* (2013.01); *H04L 47/11* (2013.01); *H04L 43/0858* (2013.01); *H04L 43/0882* (2013.01)

(58) Field of Classification Search
None
See application file for complete search history.

(56) References Cited

U.S. PATENT DOCUMENTS

| 2002/0133618 A1* | 9/2002 | Desai ................... H04L 12/2801 709/238 |
| 2007/0286192 A1 | 12/2007 | Pantelias |
| 2008/0120667 A1 | 5/2008 | Zaltsman |
| 2010/0061235 A1 | 3/2010 | Pai et al. |
| 2011/0149826 A1 | 6/2011 | Choi |
| 2012/0147751 A1 | 6/2012 | Ulm |

OTHER PUBLICATIONS

CA, CIPO Office Action relating to Application No. 2,841,623, dated May 1, 2015.
CIPO, CA Office Action relating to Application No. 2,841,623, dated Dec. 3, 2015.

* cited by examiner

*Primary Examiner* — Ian N Moore
*Assistant Examiner* — Brian T Le
(74) *Attorney, Agent, or Firm* — Rowand LLP (57) ABSTRACT

Described is a method of managing the bonding of transmissions over a legacy transmission system and over a new transmission system, the legacy transmission system comprising a legacy Cable Modem Termination System (CMTS), the new transmission system comprising a new CMTS and configured to transmit data using a new mode, the method comprising: receiving data at the new CMTS, the data comprising an identification of a receiver as a destination for the data, the legacy receiver configured to receive data transmitted using the legacy mode; monitoring an output of the legacy CMTS; and determining, based on the monitored output, whether to route the data to the legacy CMTS to transmit to the receiver.

12 Claims, 4 Drawing Sheets

CHANNEL BONDING FOR MULTIPLE COMMUNICATION SYSTEMS

TECHNICAL FIELD

The present disclosure relates to transmission systems and, more particularly, to managing the bonding of transmissions over two or more transmission systems.

BACKGROUND

Communication systems, such cable (or wired) broadband networks, wireless broadband networks and WiFi networks often allow for downstream data transmissions. For example, a communication system may provide for content, such as video or voice data, to be transmitted from a head end system operated by a service provider to one or more receivers operating within the communication system.

Similarly, such communication systems may allow for upstream data transmission. For example, a communication system may provide for content to be transmitted from a receiver to the head end system.

Such communication systems often change to using new equipment in place of legacy equipment. New equipment can involve the use of new transmission schemes.

DETAILED DESCRIPTION OF EXAMPLE EMBODIMENTS

In one aspect, disclosed is a method of managing the bonding of transmissions over a legacy transmission system and over a new transmission system, the legacy transmission system comprising a legacy Cable Modem Termination System (CMTS), the new transmission system comprising a new CMTS and configured to transmit data using a new mode, the method comprising: receiving data at the new CMTS, the data comprising an identification of a receiver as a destination for the data, the legacy receiver configured to receive data transmitted using the legacy mode; monitoring an output of the legacy CMTS; and determining, based on the monitored output, whether to route the data to the legacy CMTS to transmit to the receiver.

In accordance with another aspect, disclosed is a method of managing the bonding of network transmissions over a legacy transmission system and over a new transmission system, the legacy transmission system comprising a legacy CMTS, the new transmission system comprising a new CMTS and a new receiver, the new transmission system configured to transmit data using a new mode, the method comprising: determining that the new transmission network is congested; capturing a transmission schedule for the legacy transmission system from the legacy CMTS; creating a new transmission schedule based on the captured transmission schedule, the new transmission schedule comprising a schedule of transmission of data from the new receiver to the legacy CMTS; and, transmitting the new transmission schedule to the new receiver configured to transmit data using the new transmission system.

In accordance with another aspect, disclosed is a communication system comprising: a CMTS, the CMTS configured to determine whether to transmit data to a receiver though an associated legacy CMTS; and, a monitor connected to the CMTS, the monitor configured to monitor the output of the legacy CMTS, wherein the determination of whether to transmit data to the receiver through the associated legacy CMTS is based on the monitored output.

Other example embodiments of the present disclosure will be apparent to those of ordinary skill in the art from a review of the following detailed description in conjunction with the drawings.

Exemplary Communication System

Figure 1:
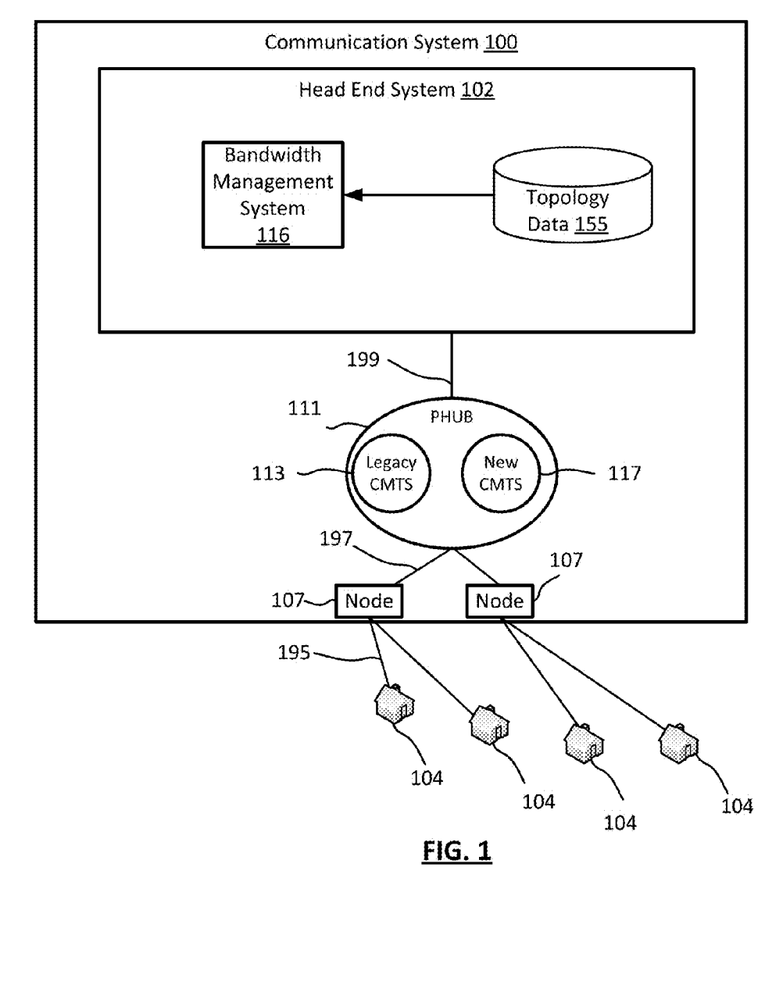
FIG. 1 is a block diagram of an exemplary communication system with a legacy transmission system and a new transmission system.

FIG. 1 is a block diagram of an exemplary communication system 100.

The communication system 100 is configured to manage the transmission of data between a content source system and a content destination system. In one or more embodiments, the content source system can itself be a content destination system. In other words the content source system can be configured to receive data transmissions.

Further, the communication system 100 may be configured to manage the transmission of different formats of data between content destination systems and content source systems. For example, the communication system 100 may include a broadband network capable of transmitting multiple formats of digital data across multiple transmission channels.

In the example embodiment illustrated, the system from which content is delivered (i.e. the content source system) is referred to as a head end system 102 and the system receiving the content (i.e. the content destination system) for presentation on a media player (such as a television), is referred to as a receiver 104, an end user device or Customer Premises Equipment (CPE). In an alternative embodiment, data may be transmitted from a receiver 104 to or through the head end system 102 and (optionally) to another receiver 104 or to another content destination system. A content destination system can be a server for example.

In at least some example embodiments, the communication system 100 is a broadcast television system which delivers television content such as broadcast television shows. In at least some example embodiments, the communication system 100 is an Internet access service which provides access to the Internet (including downloading and uploading content to or from the Internet).

The receivers 104 are typically located in a location associated with a subscriber such as, for example, the home of a subscriber. Accordingly, in at least some example embodiments, the receivers 104 may be referred to as Customer Premises Equipment (CPE). A receiver 104 may be connected to a media player, such as a television, on which content received at the receiver 104 may be displayed. In at least some example embodiments, a receiver 104, or parts thereof, may be internal to a media player (e.g. the television). For example, a receiver 104 may be a component of a television which is included in the television at the time of manufacture. In other embodiments, a receiver 104 may be an external receiver 104 which is connected to the media player (e.g. the television) through a wired or wireless transport medium.

The receivers 104 are illustrated in FIG. 1 using houses to illustrate that the receivers 104 may be distributed among different households associated with different subscribers. However, it will be appreciated that a single household may, in some embodiments, include multiple receivers 104 and that receivers 104 need not, in all embodiments, be located within houses.

One or more of the receivers 104 which are serviced by the communication system 100 may, in at least some example embodiments, be a set top box. A set top box is a device which connects to a television (or other display) and an external source of signal, turning the signal into content which may be displayed on the television (or other display). The term set top box includes devices which do not, necessarily, sit on top of a television. That is, the term set top box may refer to any device which is external to a television (or other display) and which receives an external signal, turns the signal into content and displays the signal on the display.

The receivers 104 may also take other forms including, for example, a gaming console, a cable card, a personal computer, a tablet device, a smartphone, etc. The receivers 104 may be any electronic devices at which content from a head end system 102 may be received. The receivers 104 may also comprise one or more modems. For example, a receiver 104 can comprise a cable modem. By way of further example, each receiver 104 (or modem) may be connected to a Local Area Network (LAN) onto which one or more electronic devices are attached (e.g. PC, tablet computer, smartphone, etc.). The receivers 104 may receive (or send) transmitted data destined for an electronic device associated with the LAN.

The receivers 104 are connected to the head end system 102 through transport mediums 195, 197, 199. In the embodiment illustrated, the communication system 100 can be a content delivery system which delivers content to the receivers 104 over wired transport mediums 195, 197, 199; or the communication system 100 can be a content transmission system which manages or provides for the transmission of content between receivers 104 and the head end 102 or between multiple receivers 104 over wired transport mediums 195, 197, 199. The wired transport mediums 195, 197, 199 may include cables, for example. The wired transport mediums 195, 197, 199 may, in various embodiments, include copper, or other wires, such as coaxial cable and/or may include an optical transport medium, such as fibre optic cables. The wired transport medium 195 may be a hybrid fibre coaxial ("HFC") cable, for example.

As illustrated in FIG. 1, the head end system 102 may not be connected directly to the receivers 104. In at least some embodiments, one or more intermediary systems or devices may facilitate the transmission of content between the head end system 102 to the receivers 104. For example, in at least some embodiments, a hub 111 (which may also be referred to as a distribution hub) may connect to the head end system 102. The hub 111 may be connected to the head end system 102 through a transport medium 199. In at least some embodiments, the transport medium 199 connecting the head end system 102 to the hub 111 may be a high bandwidth transport medium, such as a fibre cable.

In the example embodiment illustrated, the communication system 100 includes one hub 111. However, in other embodiments, the communication system 100 may include a different number of hubs (e.g. a plurality of hubs). The exact number of hubs in the communication system 100 will depend, in part, on the number of receivers 104 serviced by the communication system 100. In the example embodiment illustrated, the hubs 111 are primary hubs (PHUB). A primary hub is a location from which a content delivery service may be delivered from or from which data transmissions between receivers 104 can be managed.

Each hub 111 may service a set of nodes 107. That is, each hub 111 may function to deliver content to a specific node 107, or set of nodes 107. Further, each hub 111 may facilitate the transfer of data from a specific node 107. In the example embodiment illustrated, the hub 111 is connected to and services two nodes 107. However, in practice, the number of nodes serviced by each hub 111 may be much greater. Transport mediums 197 may connect the hubs 111 to the nodes 107. In at least some embodiments, the transport mediums 197 connecting the hubs 111 to the nodes 107 are high bandwidth transport mediums, such as a fibre cables or hybrid fibre coaxial cables. In one or more embodiments, the nodes 107 and the transport mediums 195, 197 connecting the receivers 104 to the nodes and the nodes 107 to the hub 111 may be a Hybrid Fiber coax (HFC) network. In one or more embodiments, the transport medium 197 connecting the hubs 111 to the nodes 107 may be fibre and the transport medium 195 between the nodes 107 and the receivers 104 may be coax cable. The resulting nodes 107 and transport mediums 195, 197 may be identified as an HFC network.

Each node 107 may be connected to a set of receivers 104. That is, each node 107 may deliver content received from the head end system 102 (via the hub 111) to one or more of the receivers 104 connected to that node 107 and vice versa. In the example embodiment illustrated, there are two receivers connected to each node 107. However, in practice, the number of receivers 104 connected to the nodes 107 may be much greater. Each node 107 may service receivers 104 in a specific geographic area for example.

Transport mediums 195 may connect the nodes 107 to the receivers 104. The transport mediums connecting the nodes 107 to the receivers 104 may include low bandwidth transport mediums, such as copper cable (e.g. coaxial cable). Further, transport mediums 195 connecting the nodes 107 to the receivers 104 may constitute HFCs.

Figure 2:
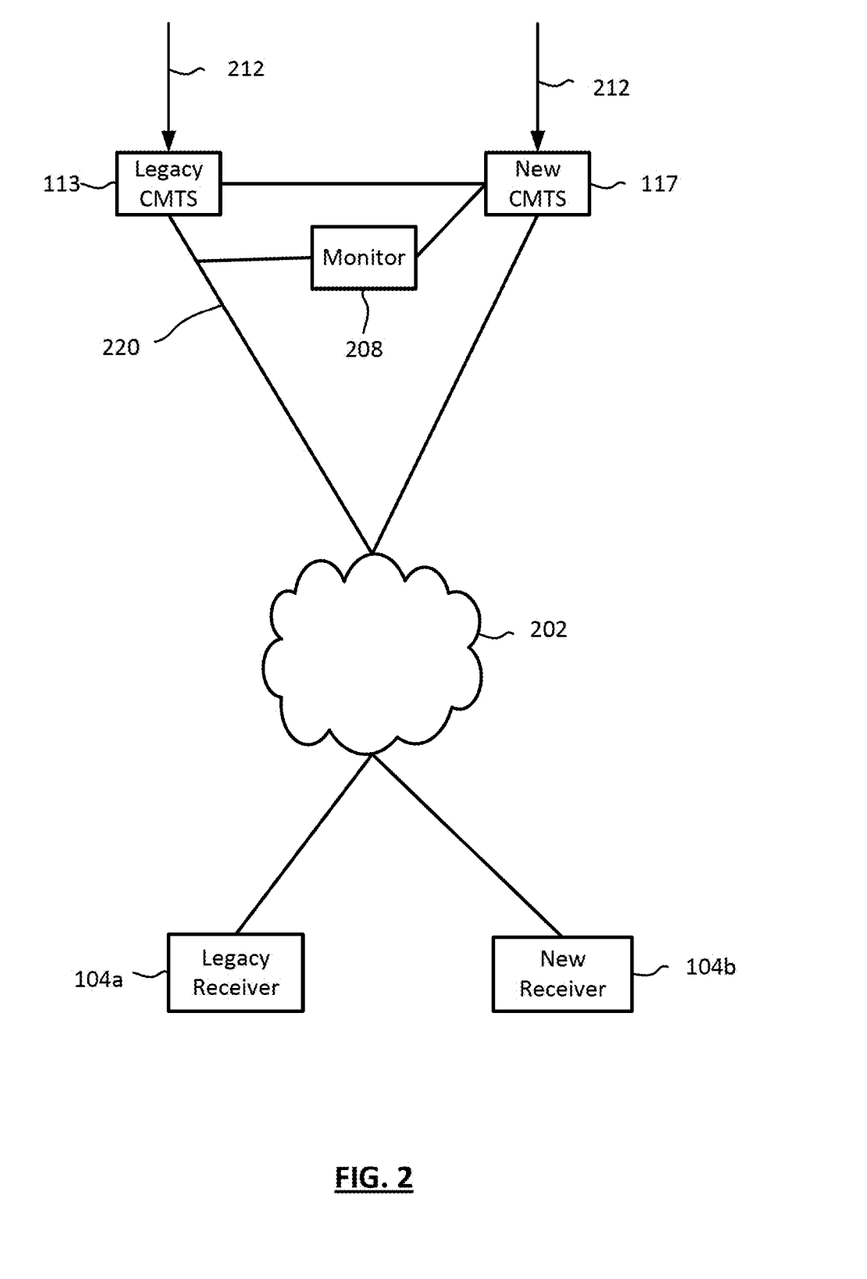
FIG. 2 is a detailed block diagram communication system including a new transmission system and a legacy transmission system.

The communication path between the hub 111 the receivers 104, which can include transport mediums 195, 197 and nodes 107, may be called a network or an HFC network (identified by numeral 202 in FIG. 2).

Various components of the communication system 100 and the receivers 104 may define a topology for the communication system 100. The topology for the communication system 100 defines the form of interconnections of the components of the communication system 100 and the receivers 104. That is, the term topology is used to describe the manner by which a receiver 104 connects to communication system 100 to receive or transmit content or data. Each receiver 104 may connect to the head end system 102 via a specific hub 111, a specific Cable Modem Termination System ("CMTS") (e.g. a new CMTS 113 and a legacy CMTS 117, which are described below) and a specific node 107. These specific connections define the topology of the communication system 100. In at least some embodiments, the communication system 100 may track this topology. For example, the communication system 100 may, in at least some embodiments, obtain topology data 155 specifying specific components (e.g. the specific nodes 107 and/or hubs 111 and/or CMTSs 113, 117) which can connect a receiver 104 to the head end system 102. For example, the topology data 155 may specify the path between the head end system 102 and each receiver 104 as provided by the communication system 100.

The topology data 155 may be stored in memory of the communication system 100. In some example embodiments, the memory includes non-volatile memory, such as flash memory. In at least some example embodiments, the memory includes a solid state drive (SSD) and/or a magnetic storage, such as a hard disk drive (HDD). Other types of memory may be used instead of or in addition to those listed above. In the example embodiment illustrated, the topology data 155 is stored in memory of the head end system 102. However, in other embodiments, the topology data 155 may be stored elsewhere.

In at least some embodiments, the topology data 155 may be automatically generated. For example, the topology data 155 may be generated by sending data from the head end system 102 to a receiver 104 and by tracking the components which are used in the transmission of the data. Other methods of generating the topology data 155 may be used in other embodiments. The topology data 155 may be repeatedly updated to account for receivers 104 brought online or offline in the communication system 100.

The communication system 100 may include one or more CMTS 113, 117. In the embodiment depicted in FIG. 1 there is a legacy CMTS 113 and a new CMTS 117. For example, the legacy CMTS 113 may be configured to operate according to the Data Over Cable Service Interface Specification ("DOCSIS") version 3.0, and the new CMTS 117 may be configured to operate according to the DOCSIS version 3.1.

In one or more embodiments, the new CMTS 117 is configured to transmit data or to receive data (or both) in accordance with or using a new mode of communication. Similarly, the legacy CMTS 113 may be configured to transmit data or to receive data (or both) in accordance with or using a legacy mode of communication.

In one or more embodiments, data transmitted according to DOCSIS version 3.0 may be modulated onto a single Quadrature Amplitude Modulation ("QAM") carrier with up to 256 states of discrete phase and amplitude steps. Similarly, data transmitted according to DOCSIS version 3.1 may be modulated onto a series of orthogonal QAM carriers, referred to as Orthogonal Frequency Division Multiplexing ("OFDM"), with up to 4096 states of discrete phase and amplitude steps. Such modulated data or modulated signals may be transmitted over HFC networks for example. By way of further example, a transmitter or receiver configured to implement modulation in accordance with DOCSIS version 3.0 may not work with receivers or transmitters built to implement modulation in accordance with DOCSIS version 3.1.

The CMTSs 113, 117 may be located in the head end system 102 and/or in a hub 111 (such as a primary hub (PHUB) and/or a secondary hub (SHUB)). In the embodiment illustrated, the CMTSs 113, 117 are located in the hub 111. In some embodiments, the CMTSs 113, 117 may be in more than one hub 111 or in each hub 111 or the legacy CMTS 113 may be located in a different hub than the new CMTS 117.

In at least one embodiment, either or both of the legacy CMTS 113 and the new CMTS 117 include Converged Cable Access Platforms (CCAP). A CMTS (e.g. the legacy CMTS 113 or new CMTS 117) can be a component which is used to provide high speed data services to cable subscribers. In the example embodiment illustrated, the legacy CMTS 113 and the new CMTS 117 are used to provide high speed content delivery services. That is, the legacy CMTS 113 and the new CMTS 117 may be used to transmit data or to deliver content, such as television programming, to the receivers 104. Similarly the legacy CMTS 113 and the new CMTS 117 may be configured to receive data transmitted from the receivers 104. More particularly, the CMTSs 113, 117 are configured to service a specific set of nodes 107 (i.e. to send content to those nodes), thereby servicing the receivers 104 connected to those nodes. Data received at the legacy CMTS 113 or new CMTS 117 or the hub 111 from the receiver 104 is considered to be transmitted "upstream" and data that is transmitted from the legacy CMTS 113 or new CMTS 117 to the receiver 104 is considered to be transmitted "downstream." Similarly, data that that is transmitted from the hub 111 to the receiver 104 is considered to be transmitted "downstream."

In one or more embodiments, the CMTSs 113, 117 may be used to provide multiple services to subscribers. For example, the CMTSs 113, 117 (or a CCAP) may be used by a multiple system operator to provide a plurality of services, such as data (e.g. Internet), voice (e.g. phone), and/or video (e.g. television) services to subscribers. In at least some embodiments, the communication system 100 may be configured to deliver services or to manage data transmission in accordance with a DOCSIS standard. DOCSIS is an international telecommunications standard that permits high-speed data transfer to occur over cable TV (CATV) infrastructure. For example, the communication system 100 may be configured to manage the transmission of data according to each of DOCSIS version 3.1 and DOCSIS version 3.0. Accordingly, in at least some embodiments, the legacy CMTS 113 may be configured to operate according to DOCSIS 3.0 specification and the new CMTS 117 may be configured to operate according to DOCSIS 3.1 specification. Similarly, the new CMTS 117 may be configured to operate in a new version of DOCSIS than the legacy CMTS 113. In one or more embodiments, the new CMTS 117 is backward compatible, meaning that the new CMTS 117 can operate in accordance with a new DOCSIS version as well as one or more older (or legacy) DOCSIS versions (which the legacy CMTS 113 uses). The new CMTS 117 may be a component of a new transmission system and the legacy CMTS 113 may be a component of a legacy transmission system.

The head end system 102 and the receivers 104 are configured to permit downstream communications to the receivers 104 through respective transport mediums and protocols. For example, the head end system 102 and the receivers 104 are configured to permit content, such as television content, to be delivered to the receivers 104 for display on media players (such as a television) associated with respective receivers. Where the communication system 100 includes a television system (e.g. such as a cable television system), the head end system 102 may deliver content to the receiver 104 through the wired transport mediums 195, 197, 199 or through both the wired transport medium 195.

In at least some example embodiments, the communication system 100 may be configured to control the allocation of fixed resources, such as bandwidth in the communication system 100. In order to manage bandwidth, the communication system 100 may include one or more bandwidth management systems 116 which are configured to manage bandwidth in the communication system 100. The bandwidth management system 116 may also be referred to as resource management systems.

In the example embodiment of FIG. 1, the bandwidth management system 116 is included in the head end system 102. However, the bandwidth management system 116 could, in other embodiments, be included in or associated with other components of the communication system 100. In some embodiments, bandwidth management systems 116 are included in the legacy CMTS 113 or the new CMTS 117 or both. There may be more than one of either or both of the legacy CMTS 113 and the new CMTS 117 in the hub 111.

In at least some embodiments, a bandwidth management system 116 may be configured to manage bandwidth between the CMTSs 113, 117 and the nodes 107. In at least some embodiments, the bandwidth management system 116 allocates a predetermined number of transmission channels for each CMTS 113, 117 as multi-node transmission channels. Each multi-node transmission channel is configured to distribute content simultaneously to a plurality of nodes. In at least some embodiments, each multi-node transmission channel of each CMTS 113, 117 is configured to deliver content to all nodes connected to that specific CMTS 113, 117. That is, the multi-node transmission channels of each CMTS 113, 117 are used to broadcast content to all nodes connected to that specific CMTS 113, 117. The multi-node transmission channel is a transmission channel which may be accessed by all nodes connected to that CMTS 113, 117. In at least some embodiments, four transmission channels of each CMTS 113, 117 are allocated as multi-node transmission channels.

Similarly, the bandwidth management system 116 allocates some transmission channels of each CMTS 113, 117 as single-node transmission channels. Each single-node transmission channel is configured to distribute content from each CMTS 113, 117 to a single node 107 connected to that CMTS 113, 117. That is, each single-node transmission channel is used for transmitting content to a specific node 107 (and is not used for transmitting content to other nodes 107). A single-node transmission channel is reserved for a specific node and is always used for transmitting content to that node. In at least some embodiments, each CMTS 113, 117 allocates a common number of single-node transmission channels for each node 107 to ensure that all nodes 107 have equal access to content. In at least some embodiments, each node 107 is allocated three single-node transmission channels. However, the nodes 107 may be allocated a different number of transmission channels in other embodiments.

The bandwidth management system 116 is configured to select content for transmission in the multi-node transmission channels based on usage data. That is, the bandwidth management system 116 is configured to use multi-node transmission channels to deliver content which is relatively more popular and to use the single-node transmission channels to deliver content which is relatively less popular.

In at least some example embodiments, the communication system 100 provides for upstream communications from one or more of the receivers 104 to the head end system 102 (and/or other components of the communication system 100). In at least some example embodiments, upstream communications (i.e. communications originating from a receiver 104 which are sent to the head end system 102) may operate on the same transport mediums 195, 197, 199 (including the wireless network 190) and/or transport protocol as the downstream communications (downstream communications are communications originating from the head end system 102 which are sent to one or more receiver 104). For example, in a wired television system, such as a cable television system, communications originating from a receiver 104 may be sent to the head end system 102 through the wired transport mediums 195, 197, 199.

Accordingly, the head end system 102 and the receivers 104 used in the communication systems 100 provide for downstream communications from the head end system 102 to the receivers 104 and may, in at least some example embodiments, provide upstream communications from the receivers 104 to the head end system 102 (or to other receivers 104). Such upstream communications may permit the receivers 104 to communicate with the head end system 102. Such upstream communications may, for example, be useful to provide on-demand services to a receiver 104, such as video on-demand services (which may be used to deliver specific video content on request), audio on-demand services (which may be used to deliver specific audio content on request) or application on-demand services (which may be used to deliver specific applications on request) to a receiver 104. Such upstream communications may also provide Internet access services.

In one or more embodiment, the modem controller 113 or another component in the hub 111 can monitor the rate of upstream data transmission from each node 107 across the transport medium 197.

The communication system 100 and/or any of the components, features or systems of the communication system 100 discussed herein, in at least some embodiments, include one or more processors and one or more memory elements storing computer executable instructions. In at least some embodiments, the communication system 100 and/or any of the components, features or systems of the communication system 100 may operate under stored program control and execute the computer executable instructions stored on the memory element(s). In at least some embodiments, the bandwidth management system 116 is provided by a processor which executes computer executable instructions.

Furthermore, any of the features of any of the systems included in the head end system 102 may be provided by other systems of the head end system 102 and any one or more of these features may be provided by other systems or subsystems of the head end system 102 not specifically discussed herein. More particularly, the head end system 102 may not be physically or logically divided in the manner illustrated in FIG. 1. In at least some embodiments, components of the head end system 102 may be physically or logically separated from one another. In at least some embodiments, the head end system 102 may be physically separated and may, for example, include a super head end system and one or more regional or local head end systems. The super head end system and/or the regional or local head end systems may separately or collectively perform some of the functions described above with reference to FIG. 1.

In at least some example embodiments, the head end system 102 may be a modular solution in which various functions or features described herein are provided by various modules. Such modules may, for example, be rack mounted electrical devices and may interconnect with one another to collectively provide functions and features described herein. In at least some embodiments, one or more of the modules, features, systems or subsystems described herein may contain one or more processors and a memory having computer readable instructions stored thereon. The computer readable instructions may be executable by the processors and may cause the processors to provide functions described herein.

FIG. 2 shows a detailed block diagram of a communication system including a new transmission system and a legacy transmission system. The communication system includes a monitor 108, the legacy CMTS 113, the new CMTS 117, a legacy receiver 104a and a new receiver 104b.

The legacy transmission system may include the legacy CMTS 113 and a legacy receiver 104a. A legacy receiver 104a is a type receiver 104 that is configured to transmit and receive data from a legacy CMTS 113. The new transmission system may include a new CMTS 117 and a new receiver 104b. The new receiver 104b is a receiver 104 that is configured to transmit and receive data to and from the new CMTS 117. In one or more embodiments, the new receiver 104b is backwards compatible in that it can also transmit and receive data from the legacy CMTS 113. The new transmission system and the legacy transmission system may both be associated with an HFC network 202. For example, the new CMTS 117 and the legacy CMTS 113 may both be configured to transmit and receive data over the HFC network 202. The HFC network 202 can comprise transport mediums 197 as shown in FIG. 1, for example. The HFC network 202 may also comprise the nodes 107 and transport mediums 195 shown in FIG. 1.

As described above in relation to FIG. 1, the legacy CMTS 113 and the new CMTS 117 are each configured to receive data from the head end 102. For example, the arrows identified at 212 indicate that data may be received from the head end 102 (which is not shown in FIG. 2). Similarly, the legacy CMTS 113 and the new CMTS 117 may be configured to transmit data to the head end 102.

The data transmitted from either the legacy CMTS 113 or the new CMTS 117 may include an identity of the intended recipient. For example, the data may include an address (e.g. an IP address) identifying a specific receiver 104 (e.g. the legacy receiver 104a or the new receiver 104b).

The legacy CMTS 113 may transmit data in accordance with a legacy mode and the new CMTS 117 may transmit data in accordance with a new mode. For example, the new mode and legacy mode of transmission may be separate frequencies or time to multiplex signals on an HFC network 202. Synchronization or cooperation between the legacy CMTS 113 and the new CMTS 117 may be required in order to time multiplex. Thus, there may be communication between the new CMTS 117 and the legacy CMTS 113 in order to perform such a synchronization or cooperation. By way of further example, the legacy mode of transmission could comprise transmitting and receiving signals at certain frequencies or certain frequency ranges (which may be predetermined), and the new mode of transmission could comprise transmitting and receiving signals at certain frequencies or certain frequency ranges (which may also be predetermined). The receiving and transmitting frequencies may not be the same (for each of the legacy mode and new mode of communication).

The monitor 208 may be connected to the new CMTS 117 in order to transmit data to and from the new CMTS 117. The connection may be by a cable or wire, for example. Or, the monitor 208 may be included in the new CMTS 117. The monitor 208 may also be connected to the legacy CMTS 113 or, as shown in the embodiment illustrated in FIG. 3, the monitor 208 may be associated with the legacy CMTS 113 so as to monitor the transmissions along a connection 220 between the HFC network 202 and the legacy CMTS 113. For example, the monitor 208 can monitor the utilization rate or latency of data transmitted to and/or from the legacy CMTS 113.

The monitor 208 may also observer or monitor upstream transmission schedules or maps transmitted from the legacy CMTS 113 to the network 202. From the monitored transmission schedules or maps, the monitor may be able to identify future unassigned upstream transmission opportunities on the network 202 used by both the new transmission system and the legacy transmission system. In one or more embodiments, the monitor 208 may transmit monitored information (e.g. the transmission schedules or maps) to the new CMTS 117 or to a processor associated with the new CMTS 117. The CMTS 117 may use this information to assist in scheduling upstream transmission for one or more new receivers 104b.

The legacy CMTS 113, the monitor 208 and the new CMTS 117 may be part of the hub 111.

In accordance with an embodiment, the monitor 208 or another component in the hub 111 can monitor, measure or track the rate of upstream data transmission from each receiver 104 (e.g. each legacy receiver 104a or each new receiver 104b) to the legacy CMTS 113. Similarly, the monitor 208 or another component of the hub 111 can monitor or measure or track the rate of downstream data transmission to each receiver 104 (e.g. to each legacy receiver 104a or to each new receiver 104b) from the legacy CMTS 113. The monitor 208 may perform such monitoring, tracking or measuring by receiving or capturing information from the legacy CMTS 113. For example, the monitor 208 may watch or monitor the transmissions to or from the legacy CMTS 113 across the transport medium 220 connecting the legacy CMTS 113 with the network 202 and/or with the legacy receiver 104a or new receiver 104b.

In one or more embodiments, the monitor 208 (or the new CMTS 117 itself) may monitor or track the usage level of the new transmission system. For example, the monitor 208 may be able to determine that the new transmission system is congested. By way of further example, the monitor 208 may be able to determine that the new transmission system is congested by measuring the utilization rate or latency rate of the new CMTS 117.

In one or more embodiments there may be a router (not shown) that can receive data packets from the head end 102 (along arrows 212, for example). For example, such a router may follow generally known IP routing conventions to forward received data packets to one or more of the legacy CMTS 113 and new CMTS 117. By way of further example, the packets may be forwarded to the CMTS (e.g. the legacy CMTS 113 or the new CMTS 117) that matches the receiver type (e.g. a new receiver 104b or legacy receiver 104a).

Exemplary Method

Figure 3:
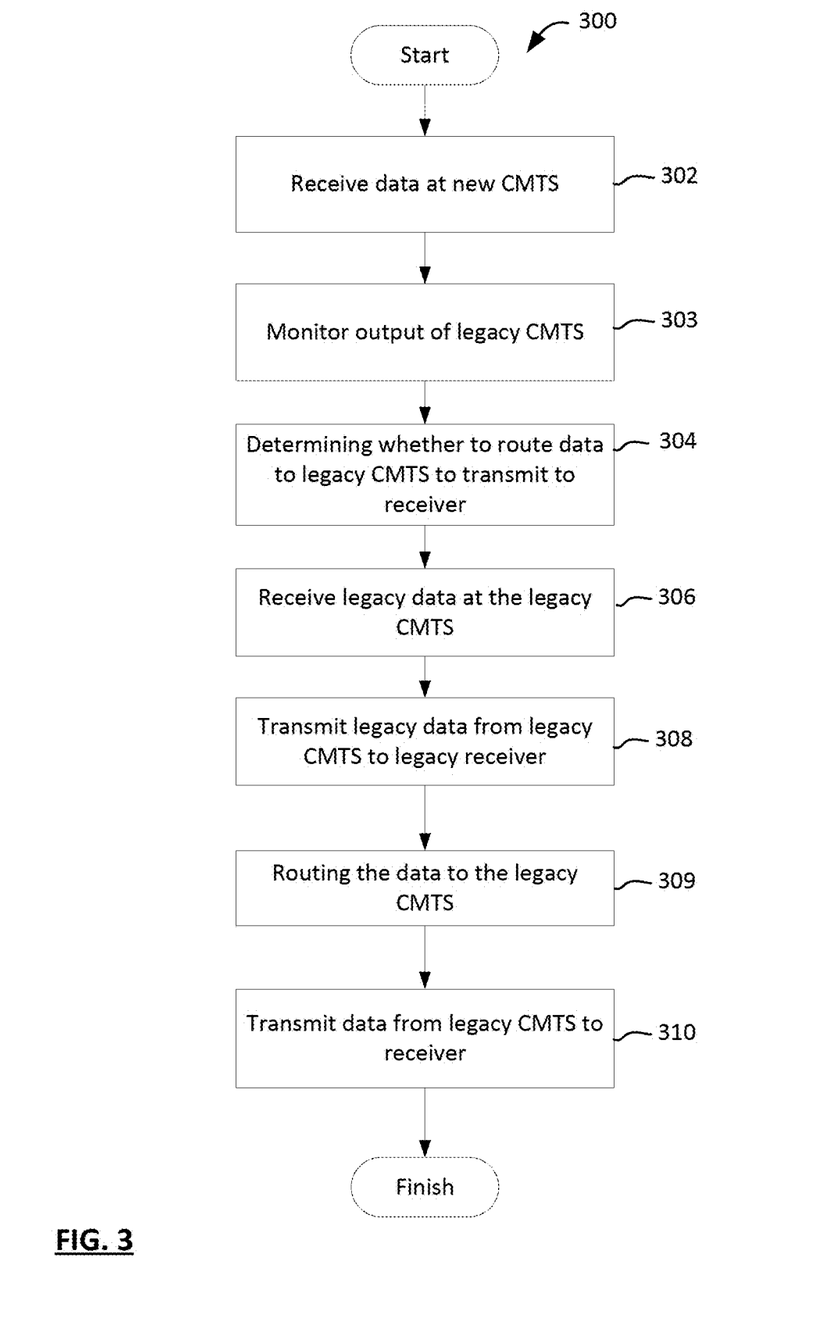
FIG. 3 is a flowchart depicting an exemplary method of managing the bonding of the transmission of data over a new transmission system and a legacy transmission system.

FIG. 3 depicts an exemplary method 300 of managing the bonding of transmissions associated with a legacy transmission system and a new transmission system. The legacy transmission system comprises a legacy CMTS 113. The new transmission comprises a new CMTS 117. The new transmission system may be configured to transmit data using a new mode. Similarly, the legacy CMTS 113 may be configured to transmit data using a legacy mode. The new transmission system may be backward compatible with the legacy transmission system such that the new CMTS 117 will be configured to receive data transmitted in the legacy mode.

The legacy transmission system may also comprise a legacy receiver 104a. Similarly, the new transmission system may also comprise a new receiver 104b. The new receiver 104b may be configured to receive and transmit data in both the new mode and the legacy mode.

In one or more embodiments, traffic destined for the new receiver 104b may be passed through the legacy CMTS 113 if the legacy CMTS 113 has available or excess capacity. The result may be an increase in the effective amount of data that may be transmitted to the new receiver 104b (because data may be transmitted through both the new CMTS 117 and the legacy CMTS 113). This may be useful at least because new receivers 104b may undergo occasional peaks of data transmission or data reception. For example, a new receiver 104b may request transmission of relatively large quantities of data (such as downloading data from the Internet). By sending some data to the new receiver 104b through the legacy CMTS 113 (when there is available capacity on the legacy CMTS 113) there may not be a requirement for very high capacity on the new CMTS 117.

At 302, data is received at the new CMTS 117. The data can be received from the head end 102 and may be transmitted through transport medium 199. The data can include an identification of a receiver 104 as a destination for the data. For example, the data may include an IP address for the new CMTS 117. By way of further example, the data may be picked up or received at the new CMTS 117 or the legacy CMTS 113 based on the mode in which the data was transmitted. In an alternative embodiment, the new CMTS 117 operates as both the legacy CMTS 113 and the new CMTS 117.

At 303, the output of the legacy CMTS 113 is monitored. For example, monitoring could include monitoring the level of utilization of the legacy CMTS 113. For example, the monitor 208 may track the data transmitted from the legacy CMTS 113. Alternatively, or additionally, the monitor 208 may track the data received at the legacy CMTS 113 (either from the head end or from a receiver 104). The monitor 208 may store the data tracked in respect of the legacy CMTS 113. For example, the data may be stored in a memory associated with the hub 111. The monitor 208 may use the tracked data to evaluate the utilization level of the legacy CMTS 113. For example, the monitor 208 may compare the level of utilization to an historical level of utilization for the legacy CMTS 113. Similarly, the monitor may compare the level of utilization of the legacy CMTS 113 with a predefined threshold in order to evaluate whether the legacy CMTS 113 is considered to be operating at capacity or congested.

In one or more embodiments, it may be determined, based on the monitored output of the legacy CMTS 113, that the level of utilization of the legacy CMTS 113 is above a predetermined threshold and, in response, the data may be transmitted to the new receiver 104b from the new CMTS 117. For example, the fact that the level of utilization of the legacy CMTS 113 is above the predetermined threshold may be indicative of the legacy CMTS 113 being congested or at capacity usage or close to capacity usage.

In one or more embodiments, it may be determined, based on the monitored output of the legacy CMTS 113, that the level of utilization of the legacy CMTS 113 is below a predetermined threshold and, in response, the data may be transmitted or routed to the legacy CMTS 113 to be transmitted to the new receiver 104b (as described below with reference to 310).

In one or more embodiments, the monitoring the output of the legacy CMTS 113 may include monitoring the latency of data packet transmission from the legacy CTMS 113. The latency may be a measurement of the time that elapses from when data is received at the legacy CMTS 113 (from the head end 102 for example) to when the data leaves or is transmitted form the CMTS 113. Such a latency measurement may be indicative of how close to capacity usage or how congested the legacy CMTS 113 is.

In one or more embodiments, it may be determined, based on the monitored output of the legacy CMTS 113 that the latency of packet transmission from the legacy CMTS 113 is above a predetermined threshold. For example, the monitor 208 or a processor associated with the hub 111 may compare the monitored (or measured) latency with a value stored in a memory associated with the hub 111. In an alternative embodiment, instead of being predetermined, the threshold may be variable. For example, the threshold may vary (e.g. automatically) depending on the historically measured latency of the legacy CMTS 113. In response to determining that the latency of packet transmission from the legacy CMTS 113 is above the predetermined (or automatically determined, or variable) threshold, the data may be transmitted to the receiver from the new CTMS 117.

The predetermined (or variable) threshold is intended to provide an indicator of the congestion or of the level of use of the legacy CMTS 113. For example, the legacy CMTS 113 is shown or measured to be used at a certain level then it may no longer be beneficial (or time-saving or more efficient) to transmit data for the new transmission system from the legacy CMTS 113 (i.e. rather than from the new CMTS 117) in order to relieve the new CMTS 117. Thus, in one or more embodiments, the threshold may be variable based on the utilization of the new CMTS 117. For example, the threshold may be a value representing the utilization or congestion of the new CMTS 117. By way of further example, the threshold may be indicative of a utilization level of the new CMTS 117 over which it is no longer beneficial or efficient or time-saving (for example) to route new transmission network data from the new CMTS 117 to the legacy CMTS 113 for transmission to the receiver (e.g. the new receiver 104b). Accordingly, the monitor 208 or the new CMTS 117 itself may monitor the output of the new CMTS 117 in order to set or adjust the threshold.

At 304, it is determined whether to route the data to the legacy CMTS 113 to transmit to the new receiver 104b. For example, the new CMTS 117 (or another component) may make the determination about whether to route the data to the legacy CMTS 113 or to transmit the data to the receiver from the new CMTS 117. The monitored output of the legacy CMTS 113 may be the basis for a measurement of how fast data will be transmitted to the receiver from the legacy CMTS 113. Such a measurement can be used in the implementation of a load balancing algorithm at the hub 111 or at the new CMTS 117. For example, a load balancing algorithm can be implemented in the new CMTS 117 to determine, based on the monitored output of the legacy CMTS 113, whether to route the data to the legacy CMTS 113 for transmission to the new receiver 104b or to transmit the data directly (i.e. from the new CMTS 117) to the new receiver 104b.

In one or more embodiments the data may include destination information such as IP addresses and/or port numbers. For example, individual data packets (of which the data may be comprised) can be associated with such destination information. The new CMTS 117 may determine whether to route data to the legacy CMTS 113 to transmit to the receiver based on the destination information included in the data. The destination information may be for end user devices that are connected to the LAN that is associated with the receiver. Thus, the need for adding sequence numbers in the new CMTS 118 or processing sequence numbers at the receiver may be avoided. Further, the need for processing sequence numbers at the receiver may be avoided. In one or more embodiments, the new CMTS 117 sorts data packets that it routes to the old CMTS 113 so that complete IP flows are sent. For example, if it is determined that data is to be routed to the legacy CMTS 113 from the new CMTS 117, then the new CMTS 117 will route all data packets in an IP flow to the legacy CMTS 113. Said another way, the determination of whether to route data to the legacy CMTS 113 from the new CMTS 117 comprises determining whether to route all data packets associated with an IP flow to the legacy CMTS 113 to transmit to a receiver. An IP flow may consist of related data packets. For example, an IP flow may consist of all packets that have the same destination, the same source IP addresses and the same port numbers.

In accordance with one or more embodiments, a pseudo-wire can be implemented. For example, the pseudo-wire can be implemented in the new transmission system to incorporate the legacy CMTS 113. By way of further example, the pseudo-wire can provide a path for data transmission from the new CMTS 117 to the legacy CMTS 113 and from the legacy CMTS 113 to the new receiver 104b. Use of such a pseudo-wire may enable the legacy CMTS 113 to ignore any IP flow characteristics of the traffic or data (or data packets) routed through it by the new CMTS 117.

The transmission of data from the new CMTS 117 to the new receiver 104b can be implemented using IP forwarding techniques or layer-3 information (e.g. layer-3 Virtual Private Network ("VPN") features). The pseudo-wire may provide a path for routing data to the legacy CMTS 113 for transmission to the new receiver 104b. The pseudo-wire may be implemented so that the legacy CMTS 113 transmits such data without processing or consideration of the layer-3 (or IP) information. The pseudo-wire effectively removes the legacy CMTS 113 from the layer-3 (IP) forwarding orchestration between the new CMTS 117 and the receiver 104 (e.g. the new receiver 104b). For example, the legacy CMTS 113 does not determine, view or process the IP address of data it receives from the new CMTS 117 for transmission to the new receiver 104b when the pseudo-wire is implemented.

In one or more embodiments, the legacy CMTS 113 may include layer-2 VPN features. The layer-2 VPN features in the legacy CMTS 113 may be used to implement the pseudo-wire. For example, the pseudo-wire can be created to mimic the behaviour of a single Ethernet link between a CMTS (e.g. the legacy CMTS 113 or the new CMTS 117) and a receiver 104 or a specific modem. By way of further example, the CMTS may be a DOCSIS 3.0 CMTS and the made may be a specific DOCSIS 3.0 cable modem. Thus, the pseudo-wire may be constructed of a layer 2 VPN over a transmission system (in this case the legacy transmission system).

In one or more embodiments, the pseudo-wire may have the following features. Data packets may be associated with (or tagged with) a layer 2 VPN address. A target device (e.g. a cable modem or a receiver 104) may be associated with or configured with a layer-2 VPN address. When the data packet is routed (e.g. step 309) from the new CMTS 117 to the legacy CMTS 113, the legacy CMTS 113 can check whether the data is tagged with a layer-2 VPN address. In other words, the legacy CMTS 113 may be able to check if the data is on the pseudo-wire. If the legacy CMTS 113 determines that a data packet is tagged with a layer-2 VPN address, the legacy CMTS 113 can transmit the data packet to the target device associated with the same layer-2 VPN address. For example, the target device can be the new receiver 104b. In another embodiment, the legacy CMTS 113 may transmit all data packets from the same data flow to the target device associated with the layer-2 VPN address. Data packets (or IP flows or data) that use the layer 2 VPN address can thus be transmitted through the legacy CMTS 113 without the legacy CMTS 113 processing such data as it typically would in the legacy transmission system. As such, in accordance with an embodiment, the legacy CMTS 113 simply passes the data packets associated with the layer 2 VPN address to the target device that is configured with the layer-2 VPN address, without any additional processing. By way of further example, the legacy CMTS 113 can pass or route the data packets associated with the layer 2 VPN address to the target device that is configured with the layer-2 VPN address without any layer-3 VPN processing. Continuing with the example, if data is received at the legacy CMTS 113 and the data is not tagged with (or associated with) a layer-2 VPN address, the legacy CMTS 133 will manage (e.g. transmit) the data as it normally would using the layer-3 VPN address. Using the layer-3 VPN address may require more processing (including time and energy) than using a layer-2 VPN address.

The pseudo-wire may also operate in the upstream direction. For example, the new CMTS 117 may be the target device and may be associated with a layer-2 VPN address. Thus, data transmitted from the new receiver 104b to the new CMTS 117 may be routed through the legacy CMTS 113 using the layer-2 VPN address (or pseudo-wire) rather than using the layer-3 (IP address) information at the legacy CMTS 113.

In one or more embodiments, the implementation of the pseudo-wire may be combined with Quality of Service settings in the legacy CMTS 113 so that the pseudo-wire traffic takes priority over other data packets. For example, the Quality of Service settings in the legacy CMTS 113 may be such that any received data (e.g. an entire IP flow) that is tagged with a layer-3 VPN address will take priority (i.e. will be transmitted before) any received data (including an IP flow) that is not tagged with a layer-3 VPN. In such an embodiment, the monitor 208 may not be used.

In one or more embodiments it is determined to route the data to the legacy CMTS 113 to transmit to the new receiver 104b. For example, the data received at the new CMTS 117 may be transmitted to the legacy CMTS 113 for transmission to the new receiver 104b using standing IP protocol (or IP forwarding rules). The new receiver 104b may be configured to receive data from either of the legacy CTMS 113 and new CMTS 117. In other words the new receiver 104b may be configured to receive data in the legacy mode and in the new mode. In one or more embodiments, quality of service tools may be used to instruct the legacy CMTS 113. For example, the quality of service tools may be associated with the hub 111.

In one or more embodiments, the new CMTS 117 is configured to transmit data in the new mode of communication or on the new transmission system.

At 306, legacy data is received at the legacy CMTS 113. The legacy data may be received from the head end 102 for example. The legacy data can include an identification of the legacy receiver 104a as a destination for the legacy data. The legacy data may be transmitted in the legacy mode. In one or more embodiments, the legacy CMTS 113 is configured to transmit data in a legacy mode and the legacy receiver 104a is configured to receive data transmitted in the legacy mode.

In one or more embodiments, the new receiver 104b and the legacy receiver 104a are one and the same (i.e. they are a single receiver 104). For example, the new receiver 104b and legacy receiver 104a may be a hybrid modem capable of transmitting and receiving data using the legacy transmission system and the new transmission system. By way of further example, the hybrid modem may be configured to transmit and receive data using both the new mode and the legacy mode of communication.

At 308 the legacy data is transmitted from the legacy CMTS 113 to the legacy receiver 104a. For example, the legacy data may be transmitted over transport medium 197, 195 or over an HFC network to the receiver. The legacy data may be transmitted in the legacy mode. Further, the legacy data may be transmitted using TCP/IP protocol.

At 309, the data is routed to the legacy CMTS 113 for transmission to the new receiver 104b.

At 310, the data is transmitted from the legacy CMTS 113 to the new receiver 104b. For example, the data may be transmitted from the legacy CMTS 113 to the new receiver 104b in the legacy mode.

In one or more embodiments, the data that is transmitted from the legacy CMTS 113 to the new receiver 104b may consist of related data packets. For example, the data may be all data packets in or associated with a particular IP flow.

In one or more embodiments, the data transmitted in the legacy transmission system may be transmitted using quadrature amplitude modulation and the data transmitted in the new transmission system may be transmitted using orthogonal frequency division multiplexing.

In one or more embodiments, the data received at the legacy CMTS 113 is prioritized based on the destination identified in the data. For example, the data received at the legacy CMTS 113 that has the receiver 104 as the identified destination may be prioritized over data received at the legacy CMTS 113 that has another receiver 104 (such as the legacy receiver 104) as the identified destination. In one or more embodiments, received data that is prioritized over other data will be transmitted before the other data. For example, the received data may be transmitted from the legacy CMTS 113 to a destination associated with (or identified in) the received data before the other data is transmitted to a destination associated with (or identified in) the other data.

Figure 4:
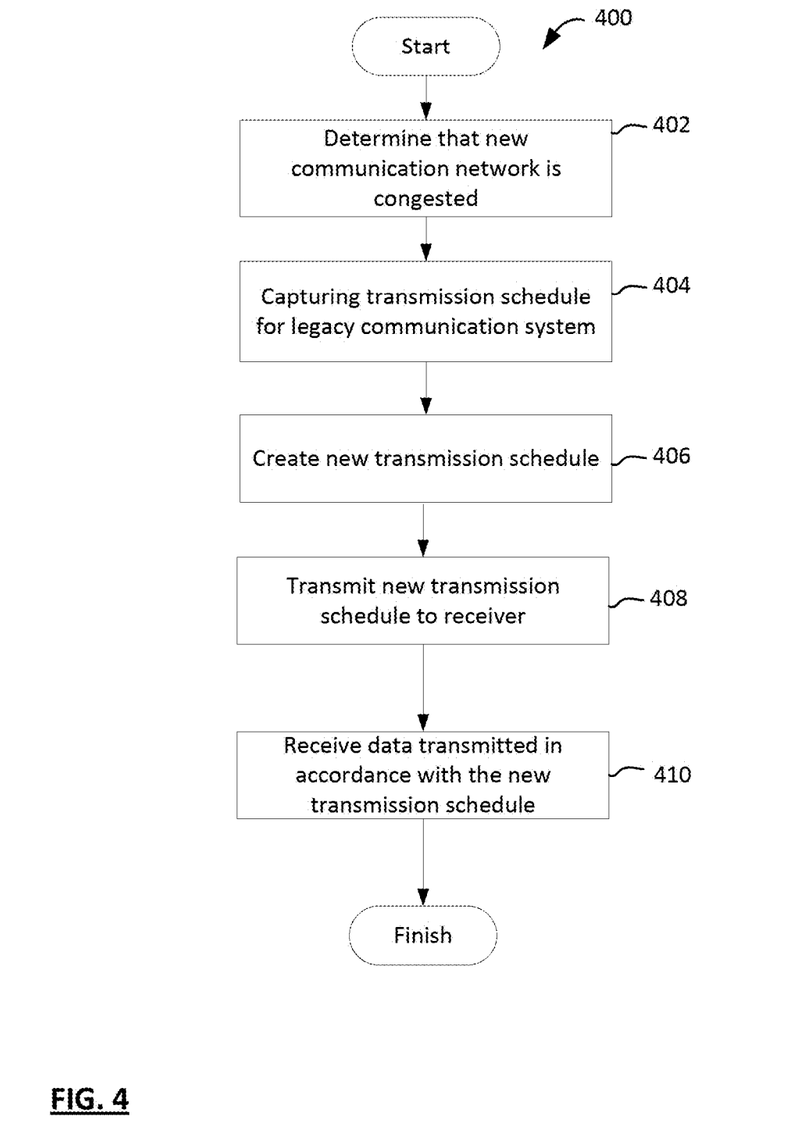
FIG. 4 is a flowchart depicting an exemplary method of managing the bonding of network transmissions over a legacy transmission system and over a new transmission system.

FIG. 4 is a depiction of a method of managing the bonding of network transmissions over a legacy transmission system and over a new transmission system. The legacy transmission system includes the legacy CMTS 113 and the new transmission system includes the new CMTS 117. The legacy transmission system may also include one or more legacy receivers 104a. Similarly, the new transmission system may include one or more new receivers 104b. The new receiver 104b may be configured to operate in both the new transmission system and the legacy transmission system. For example, the new receiver 104b may be configured to transmit data to and receive data from both the new CMTS 117 and the legacy CMTS 113. In one or more embodiments, the new transmission system may transmit data in a new mode and the legacy transmission system may transmit data in a legacy mode.

At 402, it is determined that the new transmission network is congested. For example, determining that the new transmission network is congested may comprise determining that the new transmission network is operating (e.g. is transmitting data) at a rate close to or above its capacity. For example, as explained above, the monitor 208 or the new CMTS 117 or another component associated with the hub 111 could track or measure the utilization level or the latency level of the data packets transmitted to or from the new CMTS 117 (i.e. over the new transmission network). Similarly, the monitor 208 or the legacy CMTS 113 or another component associated with the hub 111 could measure the utilization level or the latency level of the data packets transmitted to or from the new CMTS 113 (i.e. over the legacy transmission network). Using at least some of the information a determination could be made as to whether it would be more efficient to use the new CMTS 117 or the legacy CMTS 113 for transmission of data to or from a new receiver 104b. In such an embodiment, the new receiver 104b would be associated with the new transmission network. For example, the new receiver 104b could be configured to transmit data in a new mode.

For example, in one or more embodiments, determining that the new transmission network is congested includes determining that the new transmission network (e.g. the new CMTS 117) is transmitting data at a rate that is lower than a predefined threshold. The predefined threshold may be a value that is stored in a memory associated with the hub 111 or associated with the new CMTS 117. The predefined threshold may be a fixed value, specific to the specific new CMTS 117. Alternatively, the predefined threshold may be a variable value that depends on certain features related to the new CMTS 117. For example, the predefined threshold may be dependent on or based on the past rate of data transmission to or from the new CMTS 117.

The new receiver 104b may be further configured to transmit and receive data using the legacy transmission system. For example, the new receiver 104b may be configured to receive and transmit data using both or either of the new mode and legacy mode of communication. By way of further example, the new receiver 104b may be a backward compatible modem configured to transmit and receive data in either or both of the new mode and legacy mode of communication.

At 404, a transmission schedule for the legacy transmission system is captured from the legacy CMTS 113. For example, the CMTS 113 may create transmission schedules to send to receivers 104 (e.g. the new receiver 104b and the legacy 104a). The transmission schedules for the legacy transmission system include directions or instructions for one or more legacy receivers 104a with times and channels when each legacy receiver 104a is scheduled or permitted to transmit data upstream. The transmission schedule may be captured by the monitor 208 or the new CMTS 117 or another component associated with the hub 111. For example, the transmission schedule may be copied from a memory associated with the legacy CMTS 113. In one or more embodiments multiple transmission schedules associated with the legacy CMTS 113 or the legacy transmission network may be captured.

At 406, a new transmission schedule based on the captured transmission schedule is created in or at the new CMTS 117. The new transmission schedule can be a schedule of transmission of data from the new receiver 104b to the legacy CMTS 113. For example, the new transmission schedule can include time slots for when the new receiver 104b is permitted to transmit data to the legacy CMTS 113.

In one or more embodiments, the new transmission schedule comprises a map. The map can include directions for transmitting data from the new receiver 104b to one or more of the new CMTS 117 and the legacy CMTS 113 in a predefined time slot.

At 408, the new transmission schedule is transmitted to the new receiver 104b. For example, the new receiver 104b may be configured to transmit data using the new transmission system. In accordance with an embodiment, the new transmission system operates in accordance with DOCSIS 3.1 and the legacy transmission system operates in accordance with DOCSIS 3.0. DOCSIS 3.0 receivers (e.g. legacy receivers 104a) may use a different operating frequency and modulation (i.e. mode) from the DOCSIS 3.1 receivers (e.g. new receivers 104b). In one or more embodiments, the new receivers 104b may be able to receive data (or signal types) from both DOCSIS 3.1 and DOCSIS 3.0 transmission systems.

In accordance with one or more embodiments, the new transmission system and the legacy transmission system do not use time division multiplexing in the downstream. Instead, the new transmission system and the legacy transmission system may use only frequency division multiplexing in the downstream to separate the signals from the new transmission system from those of the legacy transmission system.

At 410 the data transmitted from the new receiver 104b in accordance with the new transmission schedule is received at or by the new CMTS 117. As noted above, the transmission schedule can be a map. The transmission schedule can include an indication of the schedule for transmitting data across a transmission network.

In one or more embodiments, the legacy transmission system is Data Over Cable Service Interface Specification ("DOCSIS") 3.0 and the new transmission system is DOCSIS 3.1.

The phrases "transmission system" and "communication system" may be used interchangeably throughout this document.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of managing a bonding of transmissions over a legacy transmission system and over a new transmission system, the legacy transmission system comprising a legacy Cable Modem Termination System (CMTS), the new transmission system comprising a new CMTS and configured to transmit data using a new mode, the method comprising:
   receiving first data at the new CMTS, the first data comprising an identification of a first receiver as a destination for the first data, the first receiver being configured to receive data transmitted using the legacy mode and the new mode;
   monitoring an output of the legacy CMTS; and
   determining, based on the monitored output of the legacy CMTS, whether to route the first data to the legacy CMTS to transmit to the first receiver;
   routing the first data to the legacy CMTS;
   transmitting the first data from the legacy CMTS to the first receiver,
   wherein the first data received at the legacy CMTS having the first receiver as the identified destination is prioritized over legacy data received at the legacy CMTS having a legacy receiver as an identified destination, the legacy receiver being a receiver that is configured to receive data from the legacy CMTS and not configured to receive data from the new CMTS.

2. The method of claim 1, wherein the legacy CMTS is configured to transmit data in the legacy mode, the method further comprising:
   receiving legacy data at the legacy CMTS, the legacy data comprising an identification of a legacy receiver as a destination for the legacy data; and
   transmitting the legacy data from the legacy CMTS to the legacy receiver.

3. The method of claim 1, wherein the first data is transmitted from the legacy CMTS using the legacy mode.

4. The method of claim 3, wherein the legacy transmission system transmits data using quadrature amplitude modulation and the new transmission system transmits data using orthogonal frequency division multiplexing.

5. The method of claim 1 further comprising:
   determining that the new CMTS is congested; and,
   routing the data to the legacy CMTS to transmit to the first receiver.

6. The method of claim 1, wherein the monitoring comprises monitoring the level of utilization of the legacy CMTS, the method further comprising:
   determining, based on the monitored output, that a level of utilization of the legacy CMTS is above a predetermined threshold; and
   in response to determining that the level of utilization of the legacy CMTS is above the predetermined threshold, transmitting the first data to the first receiver from the new CMTS.

7. The method of claim 1, wherein the monitoring comprises monitoring a latency of packet transmission from the legacy CMTS.

8. The method of claim 7, further comprising:
   determining, based on the monitored output, that the latency of packet transmission from the legacy CMTS is above a predetermined threshold; and
   in response to determining that the latency of packet transmission from the legacy CMTS is above the predetermined threshold, transmitting the first data to the first receiver from the new CMTS.

9. The method of claim 7, further comprising:
   determining, based on the monitored output, that the latency of packet transmission from the legacy CMTS is above a predetermined threshold; and,
   in response to determining that the latency of packet transmission from the legacy CMTS is above the predetermined threshold, delaying the transmission of further data from the new CMTS.

10. The method of claim 1, further comprising:
    implementing a load balancing algorithm in the new CMTS to determine, based on the monitored output, whether to route the first data to the legacy CMTS.

11. The method of claim 1, further comprising implementing a pseudo-wire in the new transmission system to incorporate the legacy CMTS for providing a path for data transmission from the new CMTS to the legacy CMTS and from the legacy CMTS to the first receiver.

12. A communication system comprising:
    a Cable Modem Termination System (CMTS), the CMTS configured to:
    receive first data comprising an identification of a first receiver as a destination for the first data, the first receiver being configured to receive data transmitted using a legacy mode and a new mode;
    determine whether to transmit the first data to the first receiver through an associated legacy CMTS;
    route the first data to the legacy CMTS; and
    transmit the first data from the legacy CMTS to the first receiver, and,
    a monitor connected to the CMTS, the monitor configured to monitor an output of the associated legacy CMTS, wherein the determination of whether to transmit the first data to the first receiver through the associated legacy CMTS is based on the monitored output,
    wherein the first data received at the legacy CMTS having the first receiver as the identified destination is prioritized over legacy data received at the legacy CMTS having a legacy receiver as an identified destination, the legacy receiver being a receiver that is configured to receive data from the legacy CMTS and not configured to receive data from the new CMTS.

* * * * *